United States Patent [19]

Casey et al.

[11] Patent Number: 4,605,197

[45] Date of Patent: Aug. 12, 1986

[54] PROPORTIONAL AND LATCHING PRESSURE CONTROL DEVICE

[75] Inventors: Gerald F. Casey; Richard A. Schultz, both of Portage, Mich.

[73] Assignee: Fema Corporation, Kalamazoo, Mich.

[21] Appl. No.: 692,586

[22] Filed: Jan. 18, 1985

[51] Int. Cl.[4] .............................................. F16K 31/42
[52] U.S. Cl. .................................. 251/30.01; 251/65; 251/129.08; 251/129.17; 251/129.19; 335/229; 335/234; 310/14; 310/30; 137/625.61; 137/625.64
[58] Field of Search ................. 335/229, 234; 310/14, 310/30; 251/30, 65, 85, 141; 137/625.61, 625.64

[56] References Cited

U.S. PATENT DOCUMENTS

| | | | |
|---|---|---|---|
| 2,896,588 | 7/1959 | Hayner et al. | 137/625.64 X |
| 3,119,940 | 1/1964 | Pettit et al. | 310/24 |
| 3,254,675 | 6/1966 | Johnson | 137/625.65 |
| 3,740,594 | 6/1973 | Casey | 310/30 |
| 4,127,835 | 11/1978 | Knutson | 335/266 |
| 4,144,514 | 3/1979 | Rinde et al. | 335/229 |
| 4,236,690 | 12/1980 | Smilges et al. | 251/30 |
| 4,243,899 | 1/1981 | Jaffe | 310/14 |

OTHER PUBLICATIONS

Brochure entitled "Proportional Pressure Control", FEMA Corp., 9/77.

Primary Examiner—Samuel Scott
Assistant Examiner—Allen J. Flanigan
Attorney, Agent, or Firm—Flynn, Thiel, Boutell & Tanis

[57] ABSTRACT

A proportional pressure control device having a motor with a housing and a reciprocably movable armature oriented in the housing for movement between first and second limit positions. A valve body is secured to the motor housing. A platelike poppet valve member is secured to the armature on at least one end thereof. The valve body has a fluid pressure port thereon and it extends into the interior of the valve body to a chamber. A flow restrictor device is provided in the pressure port to restrict fluid flow from an external pressure source into the pressure port and the chamber. A nozzle outlet structure is provided in the chamber and has an annular flat valve seat thereon directly opposing the poppet valve member. The spacing between the valve seat and the poppet valve member effects a controlling of the magnitude of the fluid pressure developed in the chamber. Structure is provided for effecting a movement of the armature in a manner that is substantially proportionally related to the current signal between a position of the armature at the aforesaid first limit position and a position of the one side of the poppet valve member whereat it engages the valve seat. In addition, magnetic latching structure is provided for releasably magnetically holding the armature in at least the second limit position for the armature. Compensating structure is provided between the poppet valve and the armature to permit continued travel of the armature after the poppet valve seats.

6 Claims, 6 Drawing Figures

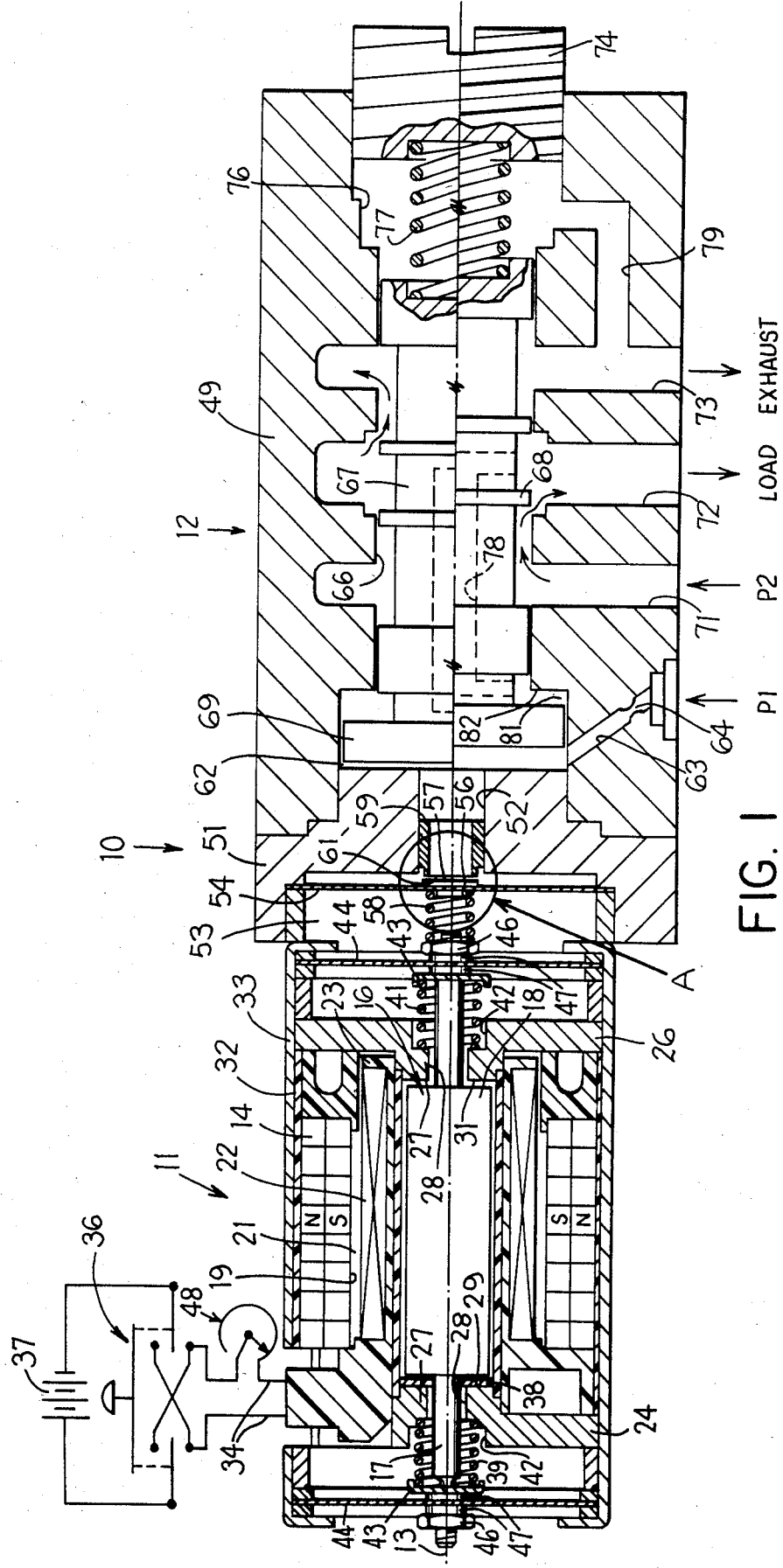
FIG. I

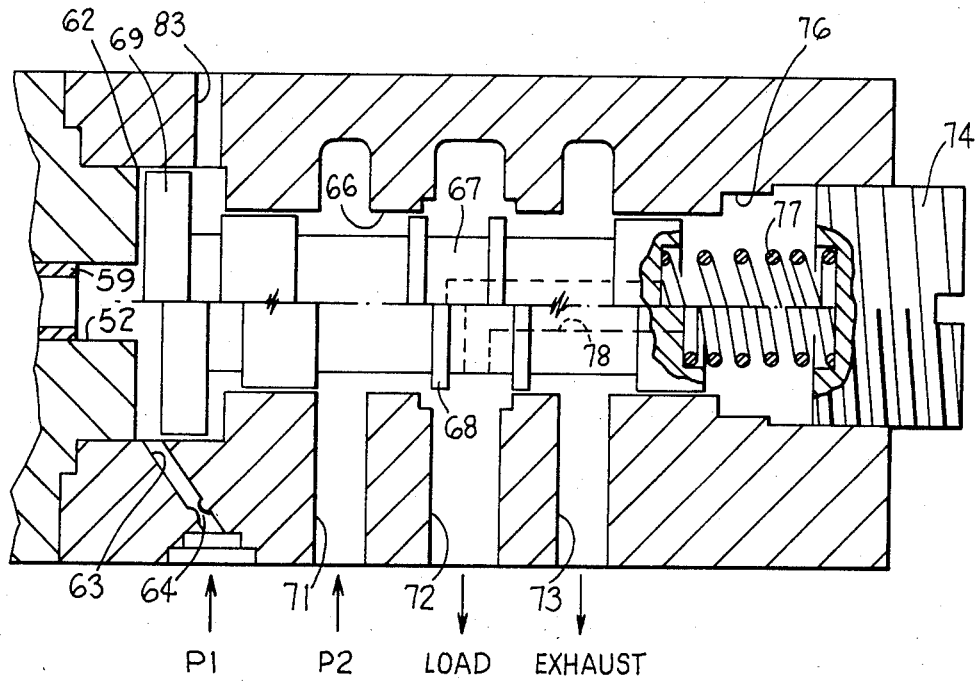
FIG. IA
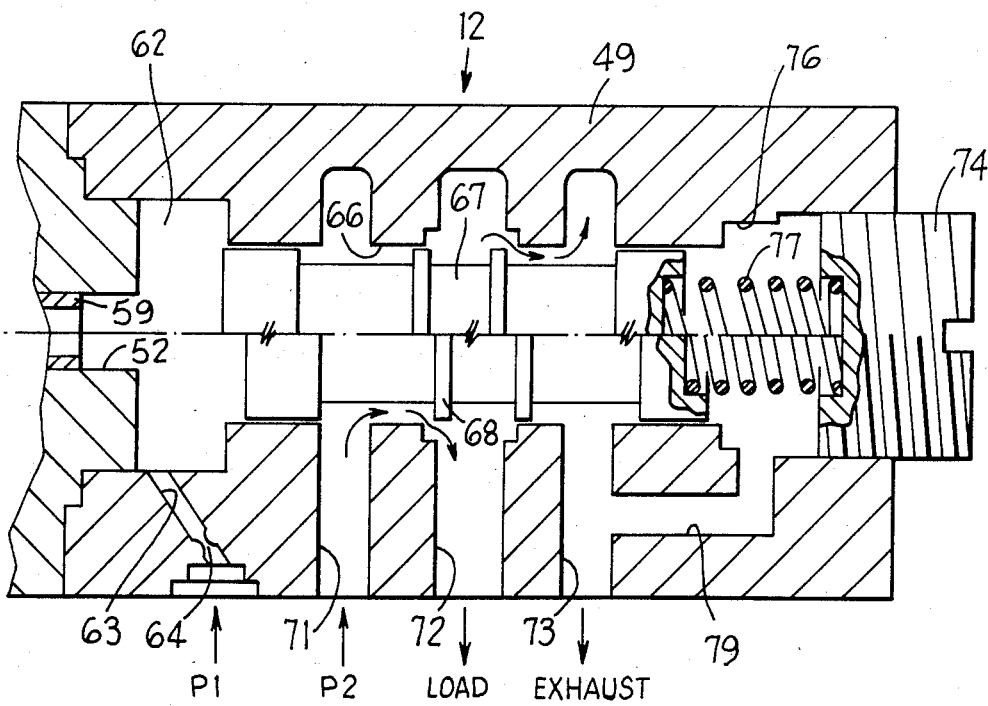
FIG. IB

PROPORTIONAL AND LATCHING PRESSURE CONTROL DEVICE

FIELD OF THE INVENTION

This invention relates to a pressure control device and, more particularly, to a permanent magnet-electromagnet pressure control device wherein the magnitude of the pressure is variable proportionately to the electrical current supply to the electromagnet, including the provision of a magnetic latch for holding the resulting pressure controlled by the device at a fixed value independent of a reduction in the value of the current to a zero value.

BACKGROUND OF THE INVENTION

This invention arose out of a need to modulate a fluid control pressure from a minimum value to a maximum value in response to an electrical signal of increasing and decreasing amplitude. For several years, proportional control units have been available for use in hydraulic and pneumatic systems. Further, magnetic latching control units (separate from the proportional units) have also been available. None of the available proportional devices or latching devices combine the proportional and latching features into a single configuration. Moreover, the known devices are not configured such that they could perform the combined function even with moderate alterations. The teachings in U.S. Pat. No. 3,740,594, assigned to the same assignee as the present invention, disclose a proportional control unit as well as a separate construction involving a latching control unit. This patent does not disclose the combined proportional and latching features into a single configuration nor does it disclose how the resulting mechanical output might be converted to a hydraulic pressure output.

A review of the known prior art disclosing devices having proportional movement capabilities indicates that for any given value of movement of the armature in the axial direction, forces increase somewhat in proportion to the increase in coil current. It has also been noted that when the current reverts to zero at any position of the stroke, the force generated by the coil current will also return to zero precluding a holding of the armature of the device at a predesignated location due to resistive forces in the system pushing the armature back away from the position whereat the armature was located at the time the current was turned off or due to the magnetic circuitry returning the armature to a preselected position. The prior art discussed above relates only to devices with mechanical outputs, however, general knowledge is available to incorporate these devices into hydraulic circuits for pressure control of either the proportional or latching type.

An investigation of the characteristics of a typical latching device utilizing permanent magnet circuits as well as electrical magnetic circuits revealed that the force to extend the armature increases as the armature moves toward the extended position and the force to retract the armature also increases as the armature moves toward the retracted position. This defines a bistable device that will latch in each of the two limit positions of the armature until coil current is applied to reverse the magnetic field and cause the armature to move in the opposite direction.

It is obviously apparent that none of the above devices exhibit the characteristics required for achieving a proportional performance (i.e. effecting an armature movement that is proportional in its movement characteristics to the current supply to the electromagnetic circuit) and a latching performance (i.e. effecting a latch at one end of the stroke following a proportional travel of the armature). It is also apparent that none of these devices exhibit the characteristics which allow the control of hydraulic pressure in a proportional manner and in the same configuration provide for a latching mode of operation which will hold pressure at a specified level even when coil current is returned to zero. The basic requirements for the overall magnetic circuit, to enable an achievement of the proportional armature travel functions and latching functions, should meet the following criteria:

(a) The proportional control must be initiated at or adjacent to the zero current armature position.

(b) The proportional range of the magnetic circuit must be maximized (desirably it should be 75% of the total stroke).

(c) The total useful stroke of the motor must include a proportional travel that is approaching five times the normal travel of a proportional (nonlatching) control and must also provide an appropriate stroke length to achieve latching.

(d) The magnetic requirement for latching based on magnetic circuit characteristics must be adjacent to the end of the proportional circuit and have a maximum force versus displacement gain approximately one order of magnitude greater than the gain in the proportional range.

(e) The relationship between the permanent magnet circuit and the electromagnetic circuit must be such that delatching will be accomplished within acceptable current limits.

In addition to the magnetic circuit requirements, the hydraulic circuit characteristics should meet the following requirements:

(f) The overall button travel required to provide the needed pressure control will be a function of nozzle and orifice size as well as the control pressure required to operate the second stage. This travel usually is in the range of 0.005 to 0.010 inches.

(g) The force required to control the hydraulic circuit will be a function of nozzle diameter and second stage pressure requirements.

(h) The physical connection between the armature and the poppet valve member must allow the armature to move full stroke (approximately 0.05 inches) while the poppet valve member travel is limited to approximately 0.005 inches.

The analysis becomes even more complex when the armature movement is resisted by a nonlinear force increase as, for example, a poppet valve member moves closer to a valve seat to close off a fluid nozzle. Thus, not only does the magnetic circuit and the electromagnetic circuit need to be varied to compensate for this nonlinear increase in the load on the armature, but also additional considerations need to be reviewed to facilitate a latching of the armature in a position whereat the poppet valve member comes into contact with the nozzle. This particular function is highly desirable in situations where a large earth moving vehicle, for example, has employed therewithin a braking system that must remain fully activated even in view of an electrical power failure on the vehicle.

Accordingly, it is an object of the invention to provide a proportional control device for proportionally controlling the pressure of a fluid within a chamber to enable that pressure to be utilized in a fluid control circuit.

It is a further object of the invention to provide a proportional control device, as aforesaid, wherein general proportionality is achieved between the magnitude of the coil current and the magnitude of the distance between the poppet valve member and the nozzle in a pressure control circuit.

It is a further object of the invention to provide a proportional control device, as aforesaid, wherein following a proportional travel of the armature, additional current supply will cause the armature to move to a latched position.

It is a further object of the invention to provide a proportional pressure control device, as aforesaid, wherein the latching of the armature will cause a control pressure to be maintained at a maximum level even though electrical current may be removed from the coil.

It is a further object of the invention to provide a proportional control device, as aforesaid, wherein the overall size of the permanent magnet and electromagnet circuitry is approximately 2 inches long and 1 inch in diameter.

SUMMARY OF THE INVENTION

The objects and purposes of the invention, including those set forth above, are met by providing a proportional pressure control device having a motor with a housing and a reciprocably movable armature oriented in the housing for movement between first and second limit positions. A valve body is secured to the motor housing. A platelike poppet valve member is secured to the armature on at least one end thereof. The poppet valve member has a flat surface thereon oriented in a plane that extends perpendicular to the direction of movement of the armature and on a side thereof remote from the armature. The valve body has a fluid pressure port thereon and it extends into the interior of the valve body to a chamber. A flow restrictor device is provided in the pressure port to restrict fluid flow from an external pressure source into the pressure port and the chamber. A nozzle outlet structure is provided in the chamber and has an annular flat valve seat thereon directly opposing the poppet valve member. The spacing between the valve seat and the poppet valve member effects a controlling of the magnitude of the fluid pressure developed in the chamber. Structure is provided for preventing a magnetic holding of the armature in a first of the two limit positions. Additional structure is provided for effecting a movement of the armature in a manner that is proportionally related to the current signal between a position of the armature at the aforesaid first limit position and a position of the one side of the poppet valve member whereat it engages the valve seat. In addition, magnetic latching structure is provided for releasably magnetically holding the armature in at least the second limit position for the armature. The poppet valve member engages the valve seat and restricts fluid flow out of the nozzle outlet when the armature is magnetically held in the second limit position. In addition, and when the armature is not magnetically held in the second position but is oriented a finite distance away from the latching position, the poppet valve member still engages the valve seat to hold the pressure in the chamber at its maximum achievable value. Compensating structure is provided between the poppet valve member and the armature for compensating for a continued movement of the armature from the aforesaid finite distance away from the second limit position for the armature toward the second limit position following an engagement of the poppet valve member with the valve seat. In other words, compliant structure is provided between the poppet valve member and the armature to enable the armature to move towards the second limit position after the poppet stroke is limited by contact with the nozzle surface. Without this compensating structure the armature could not reach the pole and therefore latching could not be achieved.

BRIEF DESCRIPTION OF THE DRAWINGS

FIG. 1 is a central sectional view through a proportional and latching pressure control device embodying the invention and a first valve embodiment for use therewith;

FIG. 1A is a second valve embodiment for use with the invention;

FIG. 1B is a third valve embodiment for use with the invention.

Figure 2:
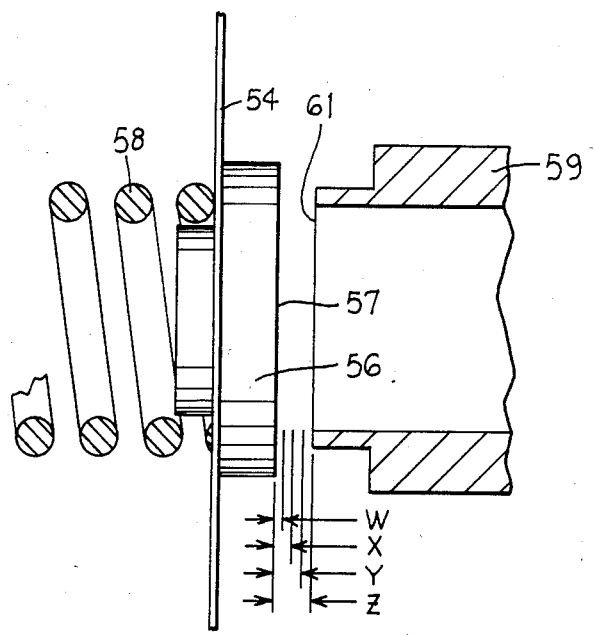
FIG. 2 is an enlarged fragment of the encircled portion of FIG. 1 identified by the reference character "A"

Certain terminology is used herein for convenience in reference only and is not to be considered limiting. For example, the words "up", "down", "left" and "right" will designate directions in the drawings to which reference is made. The words "in" and "out" will respectively refer to directions toward and away from the geometric center of the device and designated parts thereof. Such terminology will include the words specifically mentioned, derivatives thereof and words of similar import.

DETAILED DESCRIPTION

The invention described below is an improvement over the structure illustrated in U.S. Pat. No. 3,740,594. More specifically, a proportional pressure control device 10 includes a permanent magnet and electromagnetic device or motor 11 and a valve member 12. The motor device 11 has a central axis 13 and includes a permanent magnet 14 of annular shape having a radial magnetization as noted by the poles "N" and "S". The permanent magnet 14 is of a tubular shape and the length of the permanent magnet along the axis 13 is generally greater than its greatest diameter between its south poles. The permanent magnet surrounds an armature 16 of ferromagnetic material which is secured to an output shaft 17 by suitable means. The output shaft is formed of a nonmagnetic material. The length of the armature 16 is approximately as long as the length of the permanent magnet to provide a large area circumference 18.

The permanent magnet has an internal cylindrical surface 19 which is closely spaced from the armature surface 18 to provide a gap 21 therebetween. Within this gap of small dimension but of great length and area is positioned an electromagnet coil 22 of annular shape. The coil is wound on a nonmagnetic core 23 of substantial tubular shape.

Enclosing the magnets and the armature are a pair of end pieces 24 and 26 of ferromagnetic material each having inwardly turned bosses 27 to provide a bore 28 for reception and support of the shaft 17 and pole pieces 29 and 31 which also can terminate movement of the armature 16. Securing together the end pieces 24 and 26 and permanent magnet 14 at their outer circumference 32 is a tubular housing or shell 33 which, like the end pieces, is of ferromagnetic material.

Extending from the electromagnetic coil 22 are wires 34 which are connected through a rheostat 48 and a double pole, double throw switch 36 to a power source 37, configured as a battery, although it is to be understood that an alternate source may be utilized in certain uses of the present invention. The switch 36 effects, upon operation thereof, a reversing of the polarity on the wires 34 to reverse the electromagnetic field developed by the electromagnet coil 22. This field reversal is discussed in detail in the aforementioned U.S. Pat. No. 3,740,594 and reference thereto is to be incorporated herein.

A high reluctance spacer is provided on the pole piece 29 and serves to prevent the armature 16 from being magnetically attracted to the pole piece 29 when the armature is shifted to the left or retracted position. Further, a pair of springs 39 and 41 are provided on both ends of the device 11 and encircle the shaft 17. In this particular embodiment, recesses 42 are provided in each of the end pieces 24 and 26 and serve to receive therein one end of each of the springs 39 and 41. A pair of cup members 43 are fixedly secured to the shaft 17 and are movable therewith. Each cup member 43 engages the other end of the spring 43 to effect a compression thereof between the bottom of the recess 42 and the cup member 43.

The shaft 17 and armature 16 are suspended in the device 11, that is, there is no frictional engagement of the peripheral surfaces thereof with any other portion of the device. This suspension is achieved by a flexible band 44 being secured at opposite ends thereof to the interior surface of the housing 33 and snugly encircling the shaft 17. In this particular embodiment, the axial ends of the shaft 17 are threaded and a nut 46 is threadedly engaged with the shaft 17. The threaded portions of the shaft 17 extend through an appropriate opening in the bands 44 and the nuts effect a clamping of the flexible band between a pair of spacers 47 oriented between the nut 46 and the cup member 43. Thus, an appropriate selection of the thickness of the spacers 47 as well as a tightening of the nut 46 on the externally threaded portion of the shaft 17 can effect a varying compression of the springs 39 and 41 to alter the initial starting position of the armature 16 to the left, namely, to a position where the left end of the armature engages the shim 38.

The rheostat 48 is provided in the circuit defined by the wires 34 and effects a controlling of the magnitude of the electrical current signal supplied to the electromagnet coil 22.

The valve member 12 includes a valve body 49 which is affixed through an adapter 51 to the housing 33 of the device 11. The adapter 51 has a central bore 52 therein which is axially aligned with the axis 13 of the device 11. Further, the adapter 51 has a space 53 into which the right end of the shaft 17 extends. Further, a flexible band 54 is secured to the interior wall surface of the space 53 and has a poppet valve member 56 secured thereto and on a side thereof remote from the shaft 17. The poppet valve member 56 is preferably circular in its shape with the center thereof being coaxial with the axis 13. The rightwardly facing surface 57 of the poppet valve member 56 is flat and planar and extends in a plane generally perpendicular to the axis 13. In addition, a spring 58 is provided between the flexible band 54 and the nut 46 on the right end of the shaft 17. Further, the spring 58 is concentric with the poppet valve member. The purpose of the spring 58 and the poppet valve member 56 will be explained below.

The adapter 51 also includes in the bore 52 a nozzle member 59 having a flat nozzle seat 61 adjacent to the flexible band and against which the poppet valve member 56 is adapted to engage.

The valve body 49 has a chamber 62 therein which is in fluid communication with the bore 52 in the adapter 51. An inlet passageway 63 is provided in the valve body 49 and is coupled to a pressure source P1 so that the pressure source P1 can supply a pressurized fluid to the chamber 62. A flow restrictor 64 is provided in the passageway 63.

The valve body also includes a central bore 66 axially aligned with the axis 13 in the device 11. The bore 66 opens at one end into the chamber 62. A spool 67 is reciprocally mounted in the bore 66 and has an enlarged end 69 on the end thereof located in the chamber 62. The spool has a plurality of axially spaced lands 68 thereon. Further, the valve body has several ports, here ports 71, 72 and 73. A pressure source P2 is connected to the port 71 and supplies a pressurized fluid to the central bore 66. The port 72 is connected to a load and the port 73 is connected to an exhaust outlet. Thus, when the spool is shifted axially within the bore 66, the lands 68 will be positioned to control the flow of fluid from the port 71 to the port 72 as well as from the port 72 to the port 73 as indicated by the arrows in FIG. 1. It is to be noted that the upper half of the spool illustrated in FIG. 1 is shifted leftwardly from the lower half thereof. In the lower half of the illustrated spool 67, the lands 68 will permit the flow of fluid from the port 71 to the port 72. In the upper illustrated position of the spool 67, flow between the port 71 and the port 72 is blocked by the intermediate one of the lands 68 whereas fluid flow is permitted from the port 72 to the port 73.

An adjustable abutment 74 is provided at the end of the bore 66 remote from the chamber 62. A recess 76 is provided in the end of the valve member 12 remote from the end terminating in the chamber 62. A spring 77 is oriented in the recess 76 and abuts against the abutment 74. Thus, a movement of the spool 67 to the right in FIG. 1 will effect a compression of the spring 77. The initial position of the spool 67 in the bore 66 can be controlled by adjusting the extent to which the adjustable abutment 74 is moved axially of the valve body 49. A passageway 79 is provided in the valve body 67 and communicates generally from the exhaust port 73 to the recess 76 to equalize the pressure in the port 73 with the pressure developed in the recess 76. A further passageway 78 is provided in the spool 67 and communicates generally from the peripheral region of the spool communicating with the part 72 to the chamber 62, namely the volume of space 81 between the large diameter end 69 of the spool and the wall 82 of the chamber 62. Thus, and for pressure control applications, the load pressure is ported through the passageway 78 to the differential area between the large and small diameters of the spool to oppose, together with the spool spring 77, the pilot pressure acting on the left end of the spool. The right end of the spool is vented through the passageway 79.

At zero current the spool 67 is spring-biased to the left porting load pressure to the exhaust port 73. When a voltage is applied to the force motor 11, a pilot pressure is generated proportional to the current. This pressure, acting on the left end of the spool 67, shifts the spool to the right until this pressure force is balanced by the sum of the fluid flow force, spool spring force, and load pressure force ported through the spool to the differential area of the spool (i.e. the space 81). Load pressure is initially low which permits the spool 67 to overtravel up to the limit of the spool stop or wall 81 for a brief time. This provides a higher fluid flow and faster fill of the line volume between the valve and load.

As load pressure increases, the spool 67 will shift left to a new force balance position with a load pressure proportional to the given input current.

In pressure control, the spool 67 has a larger area to which pilot pressure is applied than that area for load pressure. This permits the use of a lower pilot supply pressure, P1, and also makes acceptable less than 100% pressure seal-off at the nozzle to balance the opposing load pressure when equal to supply pressure, P2.

FIG. 1A is a variation of the pressure control application which operates the same as described for FIG. 1 except the load pressure is ported through the spool to the right end of the spool. The differential volume or space 81 is vented through a passageway 83 to prevent pressure buildup, from spool leakage or a vacuum from influencing the force balance of spool.

FIG. 1B shows the valve to be ported for flow control. There is no load pressure feedback, and the spool spring recess 76 is vented to exhaust. For a given input current to the force motor 11 and corresponding pilot pressure applied to left end of spool 67, the spool shifts to the right until this opening force is balanced by the closing forces of fluid flow from the supply port P2 to the load port P1, and the spool spring 77 to regulate flow from supply port P2 to the load port while blocking flow from load port to the exhaust port. At zero current, the spool spring 77 overcomes a low pilot pressure to shift the spool to the left, porting load flow to exhaust while blocking flow from supply port P2.

OPERATION

Figure 3:
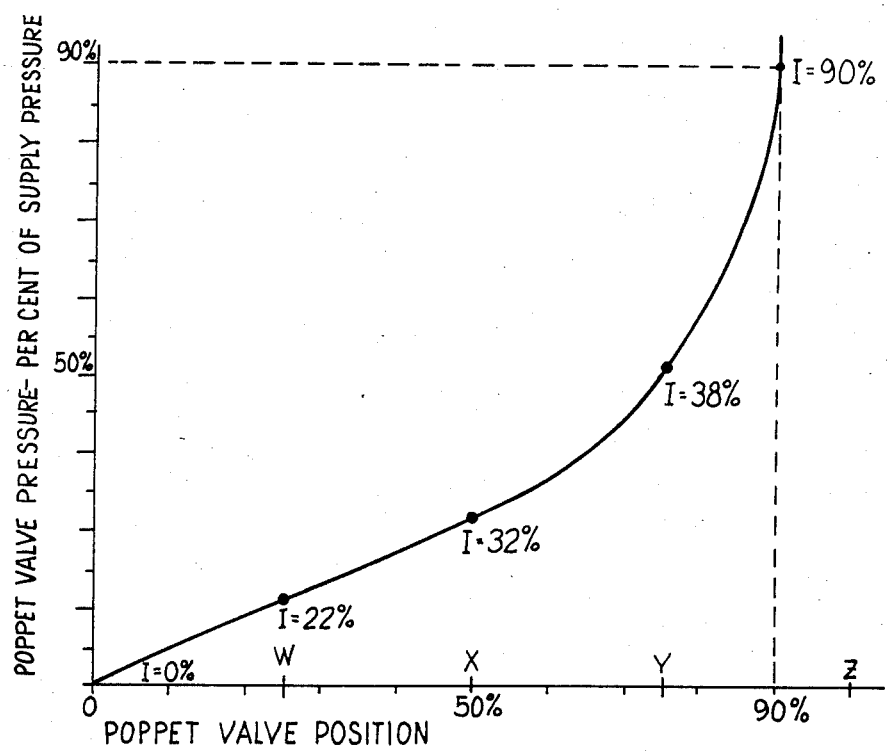
FIG. 3 is a graph illustrating the approximate degree of proportionality between the poppet valve position and the coil current.

A downward depressing of the switch 36 will supply electrical current to the coil 22 and will effect a rightward movement of the armature 16. This rightward movement of the armature 16 will also cause the shaft 17 to move rightwardly and carry therewith the nut 46 on the right end of the shaft 17 as well as the spring 58 resting thereon. The spring 58 will be sufficiently rigid to prevent significant compression thereof at this point and, as a result, the flat surface 57 on the poppet valve member 56 will be urged an increment "W" (FIG. 2) closer to the valve seat 61. A variation of the adjustment in the rheostat 48 will cause more current to enter the coil 22 to effect even closer movement of the surface 58 on the poppet valve member 56 to the valve seat 61, such as the increment "X" (FIG. 2). Successive variations in the rheostat adjustment will cause the poppet valve member 56 to move to the positions "Y" and eventually "Z" to bring the surface 57 into tight engagement with the valve seat 61. Similarly, a reversal of the rheostat adjustment will cause the poppet valve member 56 to move away from the valve seat 61. All during this period of time, the spring 58 undergoes minimal compression. Further, the coil current required to effect a movement of the poppet valve member 56 between the positions described above is illustrated in FIG. 3. Substantial linearity is achieved in such movement but due to the hydraulic or pneumatic resistance force generated by the fluid exiting at the nozzle member 59, precise linearity is lost in the region between the coil current being at 50% and 90% of the rated value.

Figure 4:
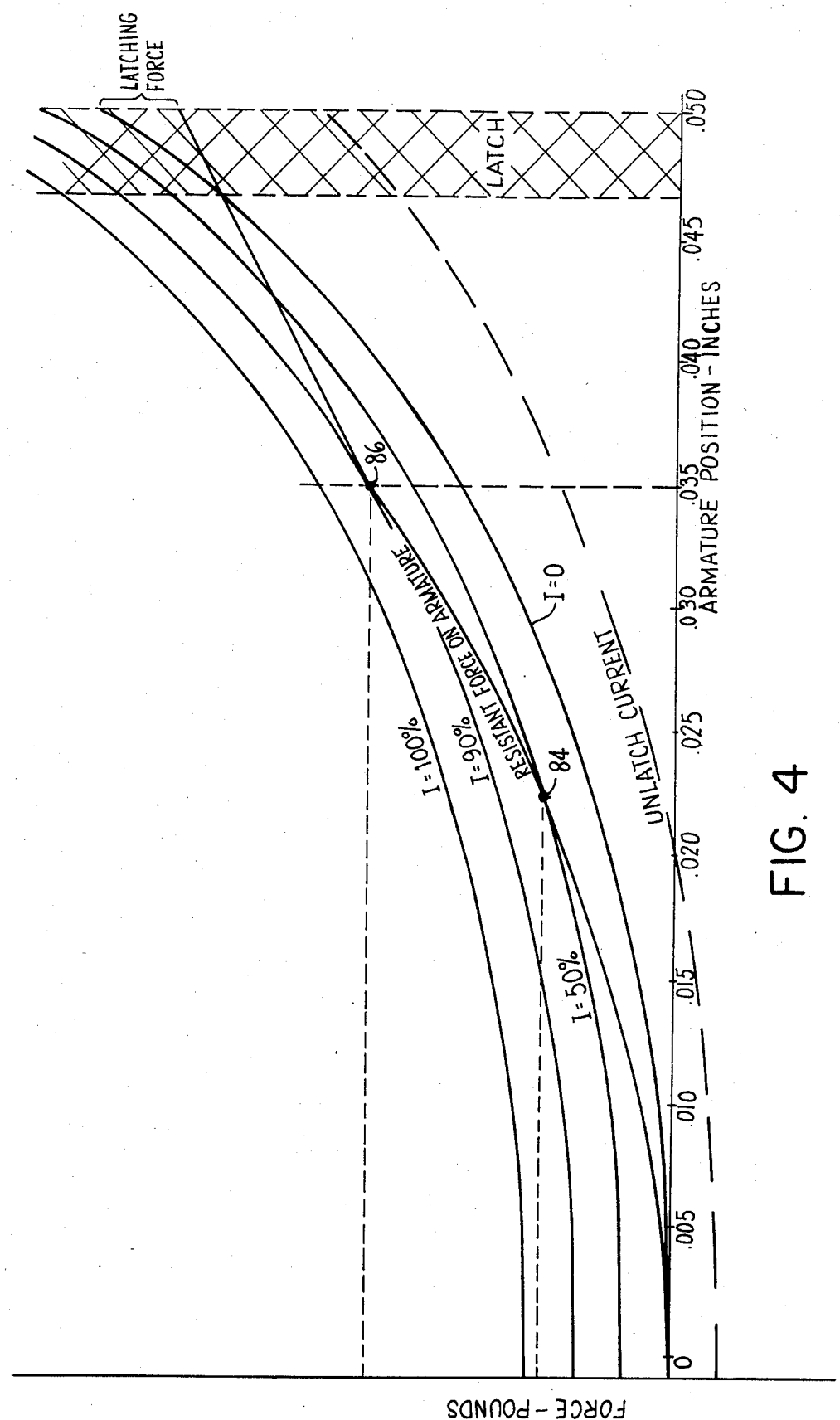
FIG. 4 is a graph illustrating the relationship between the force developed on the armature in response to varying coil current and the position of the armature.

More specifically, if the current is initially adjusted to a 50% value, the armature 16 and shaft 17 will move rightwardly until a force balance is achieved between the magnetic force and the resisting springs 39 and 41 and the hydraulic or pneumatic force at the valve seat 61. Referring to FIG. 4, a balance of these forces would be achieved at the position indicated by the reference numeral 84. If the coil current were increased to 90% of the rated value, the armature would continue to move until the poppet valve member 56 would engage the valve seat 61. This would occur at, for example, the position indicated by the reference numeral 86 in FIG. 4. At this point, no latching would be achieved because the right end of the armature 16 would be spaced too far away from the pole piece 31. Through the proper selection of the characteristics of the spring 58 relative to the force motor 11 and load characteristics, it is possible to continue to move the armature towards the latching position even after the poppet valve member 56 has made contact with the nozzle 59. In order to achieve latching, the magnetic force must be greater than the resistant force on the armature (see FIG. 4 and the curves for I=100% and resistant force on the armature). Actual latching occurs only after coil input current is reduced to zero (see FIG. 4 curve for I=0) and the resulting magnetic output is greater than the resistant force at the extreme travel position. That is, after latching has been achieved, the latching force will be stronger than the resistive forces to enable the coil current to be reduced to zero.

In order to effect a release of the latch, it will be necessary to reverse the current to the coil 22 and this can be easily achieved by lifting up on the switch 36. An adjustment of the rheostat 48 to permit a higher and higher reversal of current to flow to the coil 22 will eventually generate a sufficient force to pull the armature 16 away from the pole piece 31 and move the armature to its leftmost limit position. The armature will return to its initial position when coil current is reduced to zero. In this position, the permanent magnet and electromagnet device are ready for a recycling of the valve member 12.

The dimensions of the permanent magnet and electromagnet circuits and the encasing housing 33 (or motor 11) is approximately 2 inches long and approximately 1 inch in diameter. Further, the stroke of the poppet valve member is about 0.005 inches from its maximum spacing from the valve seat 61 to the point whereat it engages the valve seat 61 and the left to right stroke of the armature 16 is in the range of 0.035 to 0.050 inches, the poppet valve member engaging the valve seat after the armature has traveled about 60% to 80% of the total stroke. In the preferred embodiment, the stroke is approximately 75% of its total stroke capability.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A proportional pressure control device, comprising:
   a motor having a housing and a reciprocally movable armature therein movable between first and second limits;
   a valve body secured to said housing;
   a plate-like poppet valve member on at least one end of said armature, said plate-like poppet valve member having a flat surface thereon oriented in a plane that extends perpendicular to the direction of movement of said armature and on a side thereof remote from said one end of said armature;
   means defining a fluid pressure port in said valve body adapted to be connected to a fluid pressure source, said pressure port extending into the interior of said valve body to further means defining a chamber;
   wherein a flow restrictor means is provided in said pressure port to restrict fluid flow from a pressure source into said pressure port and said chamber;
   nozzle outlet means in said chamber having an annular flat valve seat thereon directly opposing said plate-like poppet valve member, the spacing between said valve seat and said valve member controlling the magnitude of the fluid pressure in said chamber;
   means for preventing a magnetic holding of said armature at said first limit position;
   means for effecting a movement of said armature in a manner that is substantially proportionally related to a variable current signal between a position of said armature at said first limit position and a position of said one side of said plate-like poppet valve member whereat it engages said flat valve seat;
   magnetic latching means for releasably magnetically holding said armature in at least said second limit position, said plate-like poppet valve member engaging said valve seat and restricting fluid flow out of said nozzle outlet means when said armature is magnetically held in said second limit position as well as oriented a finite distance away from said second limit position whereat said armature is free of said magnetic latching means and said poppet valve member engages said valve seat; and
   compensating means coupled between said plate-like poppet valve member and said armature for compensating for a continued movement of said armature from said finite distance away from said second limit position toward said second limit position following an engagement of said plate-like poppet valve member with said valve seat.

2. A proportional pressure control device according to claim 1, wherein the stroke of said armature is in the range of 60% to 80% of the total stroke capability thereof before said poppet valve member engages said valve seat.

3. A proportional pressure control device according to claim 2, wherein said stroke is approximately 75% of the total stroke capability.

4. A proportional pressure control device according to claim 1, wherein said valve body has a linearly shiftable spool therein and resisting means for resisting a shifting of said spool in one direction; and
   wherein a flow restrictor means is provided in said pressure port to restrict fluid flow from a pressure source into said pressure port and said chamber whereby as the magnitude of fluid pressure in said chamber is varied, the position of said spool in said valve body against the resistance offered by said resisting means is also changed.

5. A proportional pressure control device according to claim 4, wherein said valve body includes means defining a fluid supply port, a fluid exhaust port and a fluid control port, the position of said spool in said valve body being determinative of the magnitude of fluid flow from said supply port to said control port as well as from said control port to said exhaust port.

6. A proportional pressure control device according to claim 4, wherein said valve body includes means defining a fluid supply port, a fluid exhaust port and a fluid control port, the position of said spool in said valve body being determinative of the magnitude of fluid pressure in said fluid control port.

* * * * *